United States Patent
Zana et al.

(10) Patent No.: US 10,599,558 B1
(45) Date of Patent: Mar. 24, 2020

(54) SYSTEM AND METHOD FOR IDENTIFYING INPUTS TO TRIGGER SOFTWARE BUGS

(71) Applicant: CYBERTOKA Ltd., Tel-Aviv (IL)

(72) Inventors: Guy Zana, Holon (IL); Yuval Solodnik, Tel Aviv (IL); Baruch Weizman, Givatayim (IL); Sofia Belikovetsky, Raanana (IL)

(73) Assignee: CYBERTOKA Ltd., Tel-Aviv (IL)

(*) Notice: Subject to any disclaimer, the term of this patent is extended or adjusted under 35 U.S.C. 154(b) by 0 days.

(21) Appl. No.: 16/674,777

(22) Filed: Nov. 5, 2019

(51) Int. Cl.
| G06F 11/36 | (2006.01) |
| G06F 11/14 | (2006.01) |
| G06F 9/50  | (2006.01) |
| G06F 11/30 | (2006.01) |

(52) U.S. Cl.
CPC ........ *G06F 11/3688* (2013.01); *G06F 9/5016* (2013.01); *G06F 11/1435* (2013.01); *G06F 11/302* (2013.01); *G06F 11/366* (2013.01); *G06F 11/3692* (2013.01); *G06F 2201/84* (2013.01)

(58) Field of Classification Search
CPC ............................ G06F 9/5016; G06F 2201/84
See application file for complete search history.

(56) References Cited

U.S. PATENT DOCUMENTS

| 9,146,829 B1* | 9/2015 | Allen ................. G06F 11/3668 |
| 10,102,374 B1* | 10/2018 | Cohen ................. G06F 21/568 |
| 2003/0182312 A1* | 9/2003 | Chen ................... G06F 11/1435 |
| 2008/0301647 A1* | 12/2008 | Neystadt ............. G06F 11/3672 717/127 |
| 2011/0219454 A1* | 9/2011 | Lee ......................... G06F 16/00 726/25 |
| 2014/0047275 A1* | 2/2014 | Eddington .......... G06F 11/0766 714/37 |
| 2014/0215176 A1* | 7/2014 | Iga ........................ G06F 11/008 711/170 |
| 2014/0215483 A1* | 7/2014 | Akimoto ............... G06F 9/5016 718/104 |
| 2018/0329788 A1* | 11/2018 | Blum .................. G06F 11/3696 |
| 2019/0079854 A1* | 3/2019 | Lassance Oliveira E Silva .......... G06F 11/3692 |
| 2019/0243964 A1* | 8/2019 | Shukla .................... G06F 21/54 |
| 2019/0294537 A1* | 9/2019 | Bond ................. G06F 12/0646 |

OTHER PUBLICATIONS

Jibesh Patra et al., "Learning to Fuzz: Application-Independent Fuzz Testing with Probabilistic, Generative Models of Input Data", [Online], 2016, pp. 1-14, [Retrieved from Interent on Jan. 30, 2020], <https://pdfs.semanticscholar.org/3abc/e2e6f85817a1f66398d098115bca0edcfea2.pdf>.*

Jun Cai et al., "A Guided Fuzzing Approach for Security Testing of Network Protocol Software", [Online], 2015, pp. 726-729, [Retrieved from Internet on Jan. 30, 2020], <https://ieeexplore.ieee.org/stamp/stamp.jsp?arnumber=7339160>.*

(Continued)

Primary Examiner — Ziaul A Chowdhury
(74) Attorney, Agent, or Firm — Mark M. Friedman (57) ABSTRACT

Systems and methods are provided for efficiently identifying software bugs in computer programs and the inputs to trigger the bugs using fuzz-testing.

11 Claims, 6 Drawing Sheets

(56) References Cited

OTHER PUBLICATIONS

Jiongyi Chen et al., "IOTFUZZER: Discovering Memory Corruptions in IoT Through App-based Fuzzing", [Online], 2018, pp. 1-15, [Retrieved from Interent on Jan. 30, 2020], <https://staff.ie.cuhk.edu.hk/~khzhang/my-papers/2018-ndss-iot.pdf>.*

Song guangjun et al., "Study on software vulnerability Dynamic discovering System", [Online], 2012, p. 1-1, [Retrieved from Internet on Jan. 30, 2020], <https://search.proquest.com/openview/a755f7091184556ad9c87d7764fd8139/1.pdf>.*

* cited by examiner

SYSTEM AND METHOD FOR IDENTIFYING INPUTS TO TRIGGER SOFTWARE BUGS

TECHNICAL FIELD

The present invention is directed to detection of software bugs and detecting their triggering.

BACKGROUND OF THE INVENTION

Fuzzing or fuzz-testing is a well-known technique for automatically identifying software bugs by providing a computer program with unexpected input and then monitoring the program execution for any anomalous behavior such as crashes, memory leaks or failing assertions.

In some cases, fuzz-testing is performed by running the program on a native processor which is capable of directly running the program's code. While the use of a native processor can yield a fast execution time, this option might not always be available due to limited access to such a testing environment or the fact that the program is written in a language for which there is not a compatible native processor, on which to run the program. Alternatively, such fuzz-testing can be performed, for example, by running the software in an emulated environment. One such well known emulator is Quick Emulator (QEMU) (https://www.qemu.org/).

Fuzz-testing can be performed on the entire program or any part thereof. When performed on a portion of a program, fuzz-testing is used to try to identify software bugs in a part of the program, such as an executable, a function, a library, a set of executables, a set of functions or a set of libraries. One such environment in which Fuzz-testing of a portion of a program could be performed is Unicorn (https://www.unicorn-engine.org/docs/beyond_qemu.html).

Another conventional method to perform fuzz-testing of a portion of a program involves executing the program under a debugger, followed by taking a snapshot of the state of the execution environment of the program, as it enters the part of the program in which fuzz-testing is sought. The snapshot of the state of the execution environment is, for example:

The state of the processors running the program;
The state of the memory used by the program;
The state of the file systems used by the program; and,
The state of the hardware devices used by the program.

This taking of the snapshot of the state of the execution environment of the program, for example, is done using a debugger such as The GNU debugger (also known as gdb) or WinDBG. The snapshot is typically used at a later time in order to continue the execution of the program with different inputs. The different inputs could be generated by well-known fuzz-testing tools. One such well known tool for generating different inputs is "American Fuzzy Lop" (also known as AFL) (https://en.wikipedia.org/wiki/American_fuzzy_lop_(fuzzer)).

When performing fuzz-testing, it is sometimes advantageous to hook and divert certain functions. These hooked or diverted functions can be used to instrument (trace and monitor) the execution of the program under test, as well as to allow to execute the program under environments that are different than the environments in which the program normally executes. For example, a program might call a function that would normally perform a network service but which is not available under the testing environment. As another example, by hooking memory management function calls, the testing environment can monitor the memory usage of the program under test. Each of the hooks can, for example, after tracing the call, continue executing the original function, or alternatively, provide its own implementation.

A well-known concept in code analysis and testing is to test a basic block of code. Such a basic block typically includes a set of instructions, which have a single entry point and a single exit point such that the execution of instructions in the block normally starts with the entry point and completes with the exit point and where all other instructions are executed in a specific fixed order. The code of a program (or a part of a program) can normally be divided into distinct basic blocks.

Code coverage is a measure often used to describe the degree to which the code of a program, or a part thereof, is executed during a set of one or more executions. One possible metric for code coverage can be based on the number of unique, non-overlapping, basic blocks of a program, or a part thereof, which were executed during a set of such one or more executions.

When performing fuzz-testing, in many cases, it is advantageous to try and achieve a high level of code coverage. A high level of code coverage is typically correlated with higher chances of identifying unexpected behavior along with the inputs associated with it.

Coverage guided fuzzing is a process aimed at achieving high code coverage. For example, this is done by executing the program or a part thereof with different inputs and identifying any inputs that cause the execution of basic blocks, which were not executed previously.

As an example, assume a program consisting of N non-overlapping basic blocks, marked as A1, A2, . . . , An (where "n" represents the last element in a series of elements), and that takes as input a string of characters. Assume that under a first set of inputs, only basic blocks A1, A2, and A3 are executed. A fuzz-testing program might try a new string of characters such as 'XXAA' as input, and identify that this input causes basic block A4 to be executed. Such a fuzz-testing program can then try to feed the program with additional inputs, all of which start with the characters 'XXAA' in the hope that one or more of these will trigger the execution of additional basic blocks. One of these inputs, for example, 'XXAAYY' might cause the program to execute basic block A5. This process can be repeated recursively to achieve high levels of code coverage and ideally identify unexpected program behavior and the inputs associated with it. Other exemplary methods for modifying the input in order to achieve high code coverage could include mutating the input set by reordering the content of the input, flipping bits, duplicating a subset of the input, converting uppercase letters to lowercase or vice versa, and the like.

Another common technique used to identify the execution of new basic blocks relies on instrumenting the program, or portions thereof, and running it on a native processor. This instrumentation usually involves hooking each relevant basic block. The hooking is normally achieved by replacing the first instruction or instructions of each basic block of the program, or part thereof, with code that: 1) suspends execution of the basic block; 2) notifies the fuzz-testing environment that the basic block is being executed; and, 3) then resumes execution of the basic block. However, in some cases, such a technique cannot be used for various reasons including the fact that the instructions, which need to be placed at the beginning of the basic block, have alignment requirements, which cannot be satisfied, or that the code of any inserted hook will not end on an instruction boundary. Another example is the presence of PC (program counter)

relative instructions whose semantics are likely to change if their position is altered by the addition of hooks in the various locations.

An alternative to this type of instrumentation is to emulate the execution of the basic block. In this approach, the emulator identifies the start of the execution of the basic block by, for example, monitoring the address of the instruction that needs to be executed, and identifying any matches with the beginning of a basic block. Such an approach is disadvantageous, as using an emulator is normally much slower than running natively.

SUMMARY

The present invention avoids the aforementioned problems by observing the fact that for the purposes of identifying that a basic block is being executed, there is no need to hook the beginning of the basic block and that it would normally be sufficient to place the hook at an arbitrary location within the basic block so, long as other technical requirements such as alignment and boundary requirements are met.

Embodiments of the invention are directed to a method for identifying inputs which trigger bugs in a computer program. The method comprises: obtaining a snapshot of the state of an executing computer program; creating an executable package associated with the computer program including a fuzzing manager and a fuzzing driver; activating the executable package, to 1) run the fuzzing manager and the fuzzing driver, to instrument the computer program with at least one predetermined function to be hooked, and, 2) execute the instrumented computer program; analyzing at least one argument associated with each of the hooked functions in the computer program during its execution, to determine whether each of the at least one arguments is within predetermined limits; or matches a predetermined pattern and, should the at least one argument associated with each of the hooked functions in the computer program, be outside of the predetermined limits, or does not match a predetermined pattern, determine the input of the computer program to be the trigger of a bug in the computer program.

Optionally, the method is such that the instrumented computer program executes from the point that the snapshot was obtained.

Optionally, the method is such that it additionally comprises: extracting metadata from the snapshot of the program.

Optionally, the method is such that the metadata includes one or more of: 1) mapping between function names and their addresses; 2) basic block information; and, 3) information on memory being used such as identifying stack boundaries, VFTs (Virtual Function Tables), and code segments, to be used in detecting anomalous behavior of the computer program.

Optionally, the method is such that the creating the executable package additionally includes one or more of: fuzzing input seeds, the metadata, the computer program or portions thereof, the snapshot, and a list of the functions to be hooked.

Optionally, the method is such that the activating the executable package additionally comprises: running the fuzzing manager and the fuzzing driver to load the instrumented computer program, and provide input to the instrumented computer program.

Optionally, the method is such that the at least one argument includes the length of data being sent or received by each of the hooked functions.

Optionally, the method is such that the analyzing the at least one argument associated with each of the hooked functions in the computer program during its execution, to determine whether each of the at least one arguments is within the predetermined limits, includes: recording boundaries of at least one memory block when a hooked function is called to allocate or initialize said at least one memory block; and, checking the at least one argument against the recorded boundaries, for a memory block that crosses at least one of the recorded boundaries, when performing a memory copy operation.

Optionally, the method is such that the predetermined limits include the memory copy operation crossing the recorded boundary.

Optionally, the method is such that the analyzing the at least one argument associated with each of the hooked functions in the computer program during its execution, to determine whether each of the at least one of arguments is within the predetermined limits or matches a predetermined pattern includes determining: 1) whether one or both of: a) a source memory block, and/or, b) a destination memory block overlaps with any memory block predetermined not to be copied or overwritten, or, 2) whether a function pointer is present in a) a source memory block and/or, b) a destination memory block.

Optionally, the method is such that the predetermined limits include: limits that were predetermined to be areas of memory that are allowed to be copied or overwritten; or, limits that were predetermined not to include function pointers.

Optionally, the method is such that the analyzing the at least one argument associated with each of the hooked functions in the computer program during its execution, to determine whether each of the at least one argument is within the predetermined limits or matches a predetermined pattern, includes: when the hooked functions include memory copying routines, that the source memory block is being copied from, and the destination memory block being copied to, the source memory block and the destination memory block are each analyzed to determine whether they: 1) belong to stack memory, and, 2) that the source and/or destination memory blocks do not cross any stack boundaries.

Optionally, the method is such that the predetermined limits include: at least one of the memory blocks belonging to stack memory; or, at least one memory block crossing the stack boundaries.

Embodiments of the invention are directed to a computer system for identifying inputs which trigger bugs in a computer program. The computer system comprises: a non-transitory storage medium for storing computer components; and, a computerized processor for executing the computer components. The computer components comprise: a debugger module for obtaining a snapshot of an execution state of a computer program module; a hooking module for instrumenting the computer program or at least a portion thereof; a fuzzing manager module for analyzing arguments associated with calls to hooked functions, and determining any anomalous behavior, in the executing computer program; and, a fuzzing driver module for loading the snapshot to memory, and causing the hooking module to instrument the computer program.

Optionally, the computer system is such that it additionally comprises: a package creation module for creating an executable package. The executable package includes one or more of: the fuzzing manager module; fuzzing inputs seed;

metadata; the snapshot; the computer program; the fuzzing driver module; and, the hooking module.

Optionally, the computer system is such that it additionally comprises: a metadata extraction module for extracting metadata from the snapshot.

Optionally, the computer system is such that the metadata extraction module extracts metadata including one or more of: 1) mapping between function names and their addresses; 2) basic block information; and, 3) information on memory being used such as identifying stack boundaries, VFTs (Virtual Function Tables) and code segments, to be used in detecting anomalous behavior of the computer program.

Embodiments of the invention are directed to a computer usable non-transitory storage medium having a computer program embodied thereon for causing a suitably programmed system to identify inputs which trigger bugs in a computer program, by performing the steps when such program is executed on the system. The steps comprise: obtaining a snapshot of the state of an executing computer program; creating an executable package associated with the computer program including a fuzzing manager and a fuzzing driver; activating the executable package, to: 1) run the fuzzing manager and the fuzzing driver, to instrument the computer program with at least one predetermined function to be hooked, and 2) execute the instrumented computer program; analyzing at least one argument associated with each of the hooked functions in the computer program during its execution, to determine whether each of the at least one arguments is within predetermined limits; or matches a predetermined pattern and, should the at least one argument associated with each of the hooked functions in the computer program, be outside of the predetermined limits, or does not match a predetermined pattern, determine the input of the computer program to be the trigger of a bug in the computer program.

Optionally, the computer usable non-transitory storage medium is such that the instrumented computer program executes from the point that the snapshot was obtained.

Optionally, the computer usable non-transitory storage medium additionally comprises the step of: extracting metadata from the snapshot of the program; and, wherein the metadata includes one or more of: 1) mapping between function names and their addresses; 2) basic block information; and, 3) information on memory being used such as identifying stack boundaries, VFTs (Virtual Function Tables), and code segments, to be used in detecting anomalous behavior of the computer program.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Figure 1:
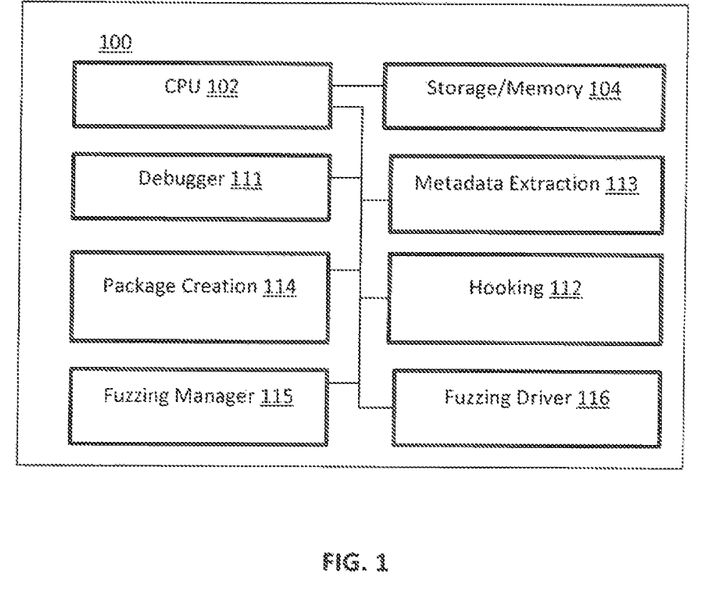
FIG. 1 is a block diagram of a computer system which performs operations in accordance with embodiments of the present invention.

FIG. 1 shows an example machine architecture, which performs the invention. The architecture is employed, for example, as part of a computer system or system 100, suitable for performing the invention. The architecture of the system 100 may be on one or more machines, computers, servers, computer components and the like. The architecture includes processors, such as a central processing unit (CPU) 102, which is linked to: storage/memory 104, and, to components or modules 111-116. "Linked" as used herein, includes both wired and/or wireless links, either direct or indirect, such that the components 102, 104, 111-116, are in electronic and/or data communications with each other, either directly or indirectly. As used herein, a "module", for example, includes a component for storing instructions (e.g., machine readable instructions) for performing one or more processes, and including or associated with processors, e.g., the CPU 102, for executing the instructions.

The CPU 102 is formed of one or more processors, including hardware processors, and performs the processes (methods) of the invention, such as those shown in the flow diagrams of FIGS. 2-6, and detailed below. These processes of FIGS. 2-6 may be in the form of programs, algorithms and the like. For example, the processors of the CPU 102 may include x86 Processors from AMD (Advanced Micro Devices) and Intel, Xenon® and Pentium® processors from Intel, as well as any combinations thereof.

The storage/memory 104 stores machine-executable instructions executed by the CPU 102 for performing the processes of the invention (e.g., as shown in FIGS. 2-6). The storage/memory 104, for example, also provides temporary storage for the system 100.

The CPU 102, for example, typically in conjunction with the storage/memory 104, runs the aforementioned programs or algorithms of FIGS. 2-6, as detailed below. The aforementioned programs or algorithms are, for example, represented in various forms including machine language/machine code for various types of processors, assembly for various types of processors, Java byte code, or in a programming language such as the "C" programming language, Java, JavaScript, Python, Go, C# or other programming languages, as well as intermediate representations of the programming languages.

The system 100 includes a debugger or debugger module 111 for executing a snapshot of an execution state of a computer program or program (the terms "computer program" and "program" are used interchangeably herein). The snapshot is the memory and/or CPU 102 state of the system used by the program being run by the CPU 102, such as the programs embodied by the processes of FIGS. 2-6, detailed below. Additionally, the debugger 111 detects the state of other hardware components of the system 100. The debugger 111, for example, attaches to a process and at any time, takes a snapshot of the CPU 102 and/or hardware state, associated with a running program. This allows for the continued execution of the program at a later time.

The system 100 includes a hooker or a hooking module 112, which instruments the program, or portions, e.g., code segments, thereof, so that certain functions, for example, I/O functions such as send, sendmsg, sendto, recv, recvmsg, recvfrom, write, read, pread, ready, print, printf, pwrite, writev, WriteFile, ReadFile, are hooked. By hooking the functions, the execution of these functions can be monitored, and anomalous program behavior can be detected. The hooking allows the program to execute in a test environment (including, for example, an emulated or virtual environment), even when there are differences between the test environment and the actual environment, in which the program normally executes.

The system 100 includes, for example, a metadata extraction module 113, which, for example, extracts metadata from the snapshot. The metadata extracted, includes, for example, one or more of: 1) mapping between function names and their addresses; 2) basic block information; and, 3) information on memory being used such as identifying stack boundaries, VFTs (Virtual Function Tables) and code segments, to be used in detecting anomalous program behavior.

The system 100 includes, for example, a package creation module 114, which, for example, creates an executable package including, for example, one or more of: 1) a fuzzing manager 115; 2) fuzzing inputs seed (input corpus); 3) metadata; 4) the snapshot; 5) the instrumented program; 6) fuzzing-driver 116; and, 7) hooking module 112. The executable package, when executed, runs the fuzzing manager 115. The metadata is used, for example, for hooking functions, and while checking arguments passed to functions. For example, metadata is usable to identify when function pointers are copied or overwritten, or to identify that certain memory blocks are copied or overwritten.

The fuzzing manager 115 or fuzzing manager module, for example, performs one or more of: 1) selecting input using the fuzzing inputs seeds; 2) uses the fuzzing-driver 116 to execute or run the instrumented program with the selected input, where the execution of the instrumented program resumes from the point at which the snapshot was taken; 3) as the instrumented program executes (runs), the fuzzing manager: a) monitors the executed program and examines any hooked functions and arguments associated therewith, and, b) detects any anomalous program behavior, and, for example, records the type of anomalous program behavior along with the input that caused it; and, 4) the fuzzing manager 115 uses the code coverage information obtained in previous program executions to select input for subsequent executions of the implemented program. For example, the fuzzing manager 115 executes the instrumented program through the use of forking or similar techniques.

The fuzzing driver 116 (sometimes called a "test-harness") or fuzzing driver module, which acts as an adapter between the fuzzing manager 115 (also known as a fuzzer), and the program being fuzzed (tested to determine the input which results in a bug), loads the snapshot into the processors, memory as well as any additional hardware whose state was captured when the snapshot was created. In some cases, where certain hardware components are not present, the fuzzing driver could emulate absent hardware component. The fuzzing driver 116 uses, for example, the hooking module 112 to instrument the program. The fuzzing driver 116 loads the snapshot once, and then, for each input generated by the fuzzer 115, the fuzzing driver 116 forks and performs an input setup operation, for example, copying the input into a memory buffer within the memory layout of the program being fuzzed. The fuzzing driver 116 then continues the execution. The fuzzer 115 monitors the process for errors.

The executable package is, for example, in a form that could be executed by a container engine. One such example is a Docker image that can be executed by a Docker engine. The fuzzing manager 115 can, for example, execute multiple concurrent instances of the instrumented program, with each instance provided with substantially different input. Multiple instances of a package may, for example, be executed concurrently on the same computer, each instance of the executable package using a substantially different set of inputs. Additionally, multiple instances of a package may, for example, be executed concurrently on multiple computers, each instance of the package using a substantially different set of inputs.

When multiple instances of the executable package are run, for example, sequentially or concurrently, they can, for example, share information as to the inputs tested and the results of executing the instrumented program using the inputs including information related to code coverage and any anomalous program behavior observed. Information could be shared, for example, using shared memory, a shared folder, or a database.

Attention is now directed to FIGS. 2-6, which show flow diagrams detailing computer-implemented processes and sub-processes in accordance with embodiments of the disclosed subject matter. These processes, for example, are performed by a computer system, such as the computer system 100 of FIG. 1. The aforementioned processes and sub-processes are, for example, performed automatically and in real time.

Figure 2:
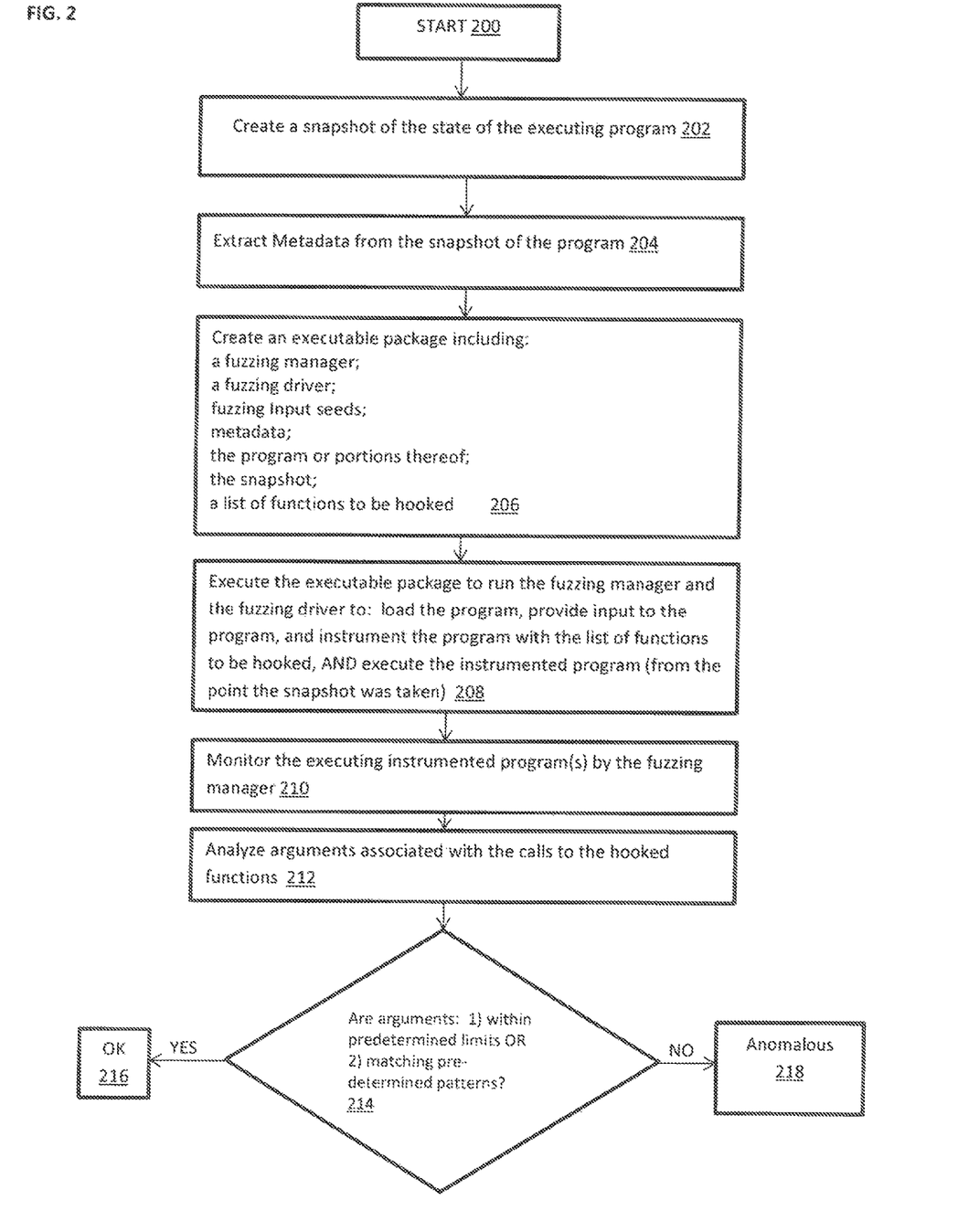
FIG. 2 is a flow diagram of a general process in accordance with the invention; and, FIGS. 3-6 are flow diagrams detailing processes performed based on the process of FIG. 2.

FIG. 2 is a flow diagram of a general process in accordance with the present invention for detecting software bugs and the functions and/or code segments that triggered these bugs. FIGS. 3-6 are processes based on portions of the aforementioned general process of FIG. 2.

In FIG. 2, the process begins at a START block 200, where a user decides to take the snapshot. For example, in a networking application, a snapshot could be taken at the beginning of a processPacket function after a connection has been established by the application.

Moving to block 202, a snapshot is created of the executing (running) program, as taken, for example, by the debugger 111.

The process moves to block 204, where from the snapshot of the program, and the program, metadata is extracted by the metadata extraction module 113. The metadata extracted, includes, for example, one or more of: 1) mapping between function names and their addresses; 2) basic block information; and, 3) information on memory being used such as identifying stack boundaries, VFTs (virtual function tables) and code segments, to be used in detecting anomalous program behavior.

The process moves to block 206, where the package creation module 114 creates an executable package including, for example, one or more of: 1) a fuzzing manager 115; 2) a fuzzing-driver 116; 3) fuzzing input seeds, e.g., input corpus such as, sample packets for a fuzzed networking program, or sample images for a fuzzed image viewer; 4) the aforementioned metadata; 5) the program or part thereof; 6) the aforementioned snapshot; and, 7) a list of functions to be hooked.

The process then moves to block 208, where the executable package is activated as it is executed (run) by the CPU 102. The execution causes running of the fuzzing manager 115 to select an input from the input seed. The fuzzing manager 115 also uses the fuzzing driver 116 to load the program, feed it with the selected input and instrument the program using the hooking module 112 and the aforementioned list of functions to be hooked. The fuzzing driver 116 also executes (runs) the instrumented program. The instrumented program is executed (run), for example, from the point that the snapshot was taken.

The process moves to block 210, where the executing the instrumented program is monitored by the fuzzing manager 115, along with the calls to the hooked functions, and the arguments to these calls. Moving to block 212, where, for example, the fuzzing manager 115, for example, analyzes the arguments passed in the calls to the hooked functions.

The process moves to block 214, where, for example the fuzzing manager 115 determines whether the analyzed arguments are within predetermined limits and/or match any predetermined patterns. If yes, at block 214, the process moves to block 216, where the behavior is normal, and bugs have not been detected. If no, at block 214, the process moves to block 218, where the behavior associated with the hooked function is considered to be anomalous.

FIGS. 3-6 are exemplary applications of the process of FIG. 2. These exemplary applications begin after block 208 of FIG. 2, with corresponding blocks of FIG. 2 taking the same numbering scheme as FIG. 2, but adding after each block number, the letter "a" in FIG. 3, the letter "b" in FIG. 4, the letter "c" in FIG. 5, and the letter "d" in FIG. 6. These letters, added to the block numbers indicate example processes based on the general processes of the correspondingly numbered blocks of the process of FIG. 2.

Figure 3:
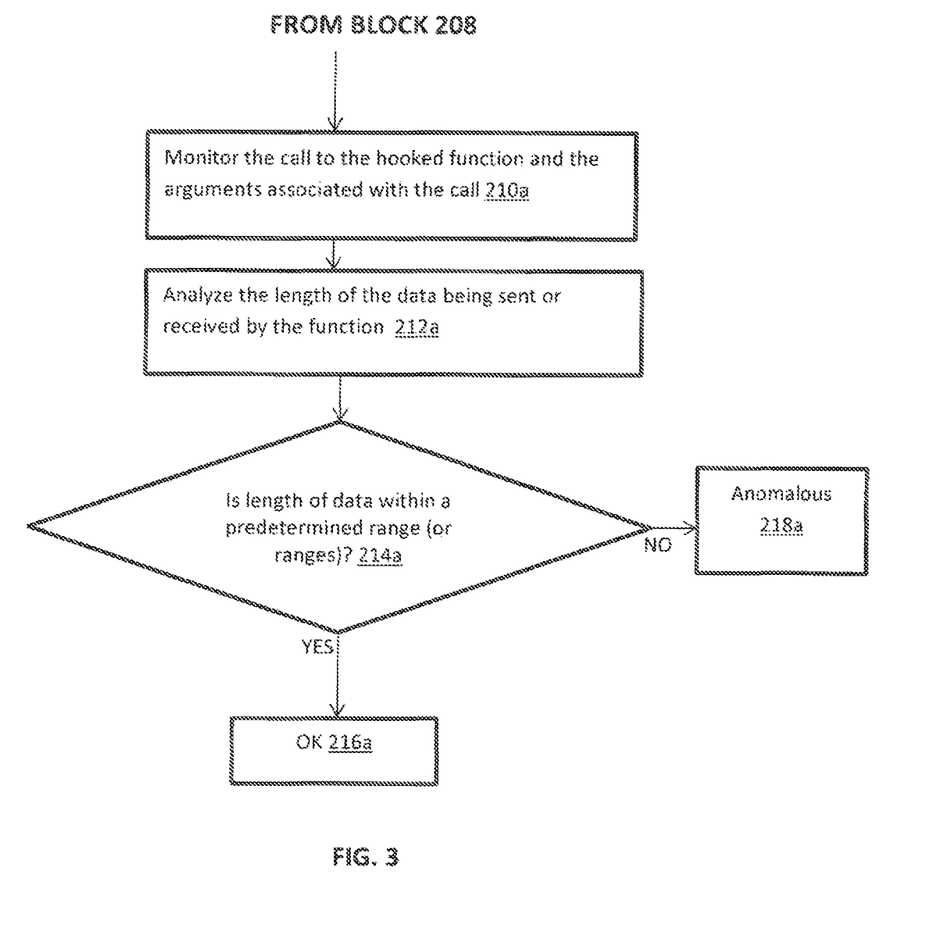

FIG. 3 is a flow diagram of an example process for determining input which triggers (initiates) a software bug. The process steps are similar to those for the general process from block 200-208. Here, the hooked functions are I/O (input/output) functions, such as send, sendmsg, sendto, recv, recvmsg, recvfrom, write, read, pread, ready, print, printf, pwrite, writev, WriteFile, and ReadFile. The calls to these hooked functions are monitored along with the arguments to these calls. From block 208 of FIG. 2, the process moves to block 210a.

At block 210a, the fuzzing manager 115 monitors the call(s) to the hooked I/O function and the arguments associated with the call(s). The process moves to block 212a, where the fuzzing manager 115, analyzes the length of the data being sent or received by each I/O function. The process moves to block 214a, where the fuzzing manager 115 determines whether the length of the data associated with each I/O function is within a predetermined range.

If the length is within the predetermined range or ranges at block 214a, the process moves to block 216a, where the behavior associated with the hooked I/O function is considered to be normal. If the length is not within the predetermined range or ranges, the process moves to block 218a, where the behavior associated with the hooked I/O function is considered to be anomalous. Anomalous behavior is such that the input associated with the hooked I/O function is considered as likely to trigger a software bug. Additionally, in such a case, the arguments passed to the functions, including the payload of these functions are to send or receive, and are recorded for future analysis. In addition, the payload could be checked for the presence of code or function pointers, which if detected, would be additional indicators of anomalous behavior.

Figure 4:
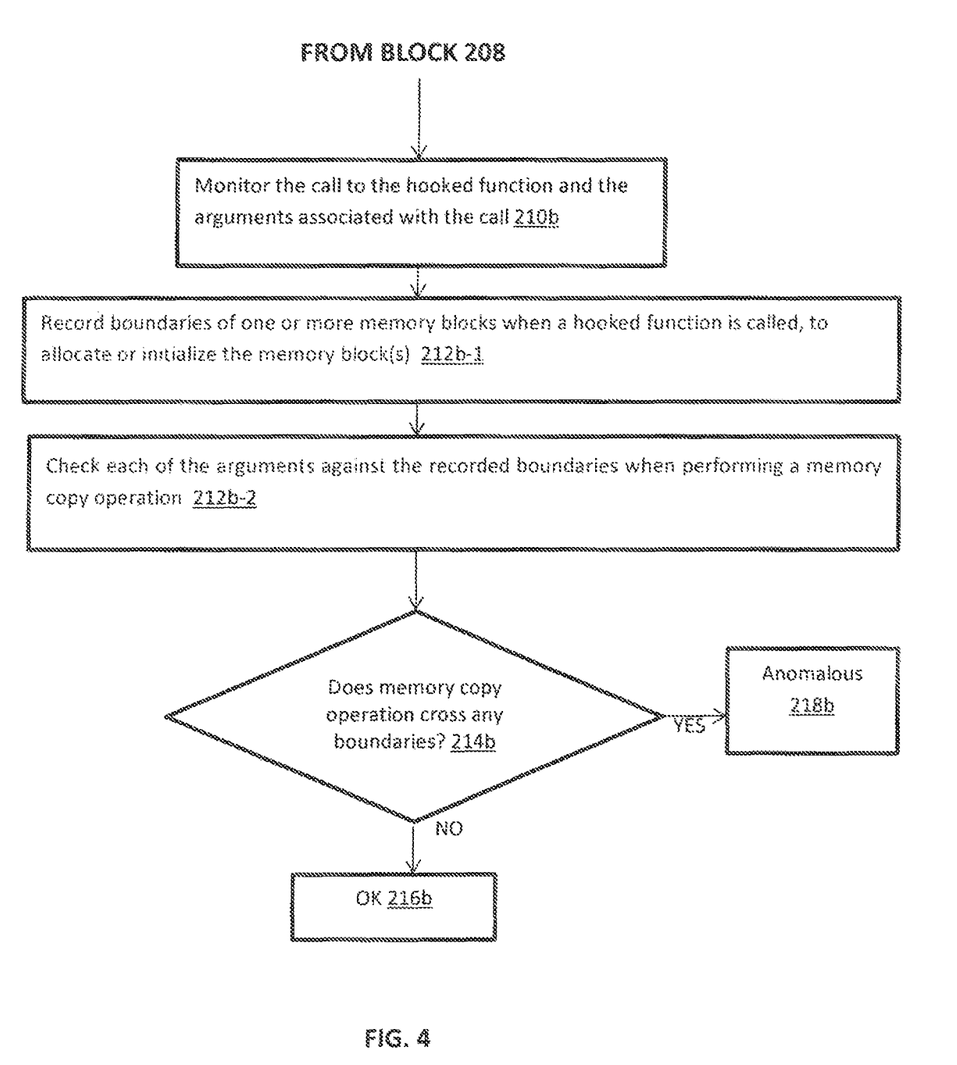

FIG. 4 is a flow diagram of another example process for determining input which triggers (initiates) a software bug. The process steps are similar to those for the general process from block 200-208. Here, the hooked functions are memory management functions, such as memory allocation routines, including, for example, malloc, calloc and realloc. The hooking may also be with memory copying routines, such as memcpy and memset. In this process, whenever a block of memory is allocated, its boundaries are recorded such that later, when a memory copy operation is performed, it is possible to check whether the memory copy operation is crossing the boundaries on either of the source memory block, the destination memory block, or both. If such behavior is detected, the behavior is deemed to be anomalous.

Moving from block 208 of FIG. 2, the process moves to block 210b, where the calls to the hooked memory management functions are monitored along with the arguments to these calls.

Moving to block 212b-1, boundaries of at least one memory block are recorded when a hooked function is called to allocate or initialize the at least one memory block.

Moving to block 212*b*-2, the arguments (e.g., at least one argument) are checked against the recorded boundaries, for a memory block that crosses at least one of the recorded boundaries, for example, when a memory copy operation is performed.

The process moves to block 214*b*, where it is determined whether the memory copy operation is crossing boundaries, e.g., the recorded boundaries, on either of the source memory block, the destination memory block, or both. If no at block 214*b*, the behavior of the function is normal, and the process moves to block 216*b*. If yes at block 214*b*, the behavior of the function is deemed to be anomalous, and the process moves to block 218*b*. Such anomalous behavior is such that, the input associated with the hooked function, e.g., memory management function, is considered as likely to trigger a software bug.

Figure 5:
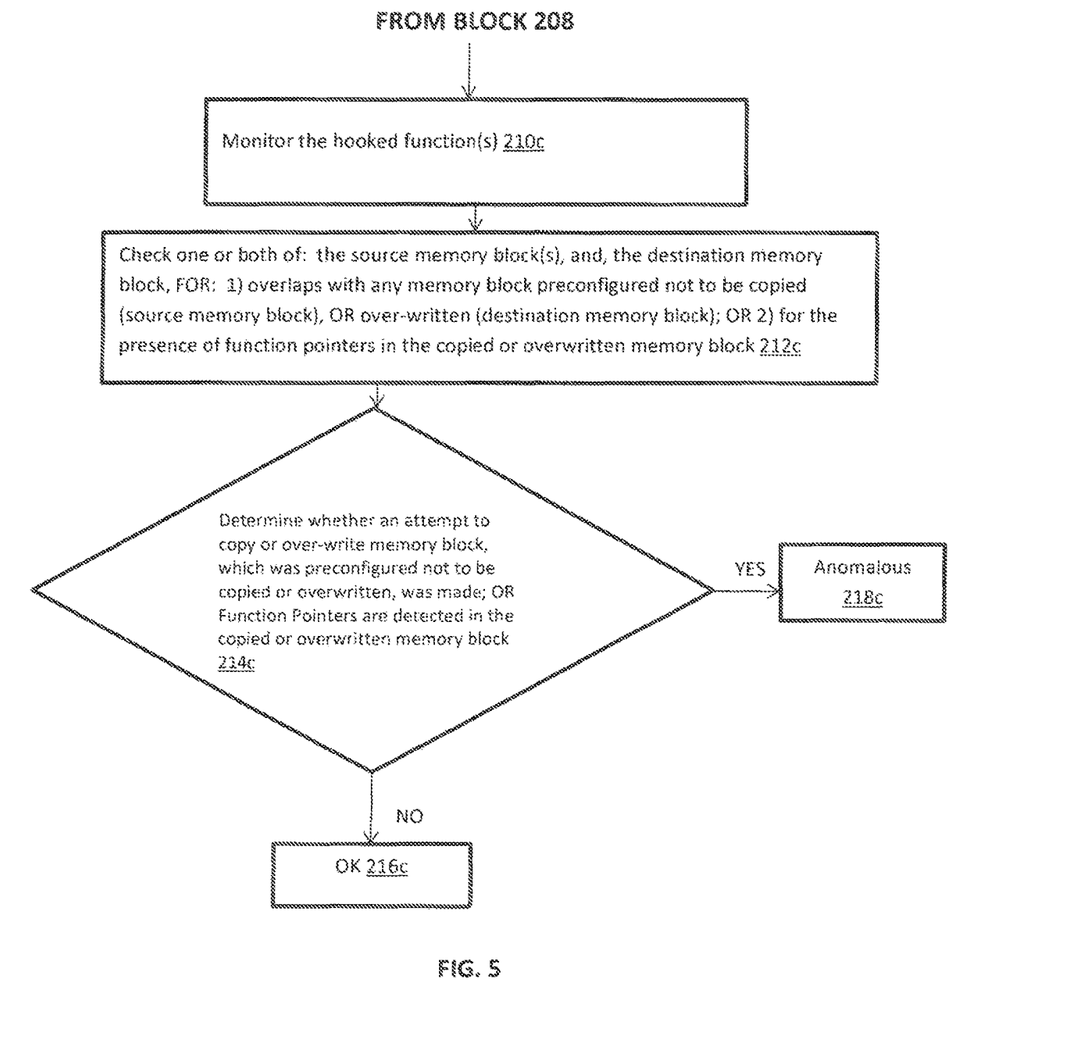

FIG. 5 is a flow diagram of another example process for determining input which triggers (initiates) a software bug. The process steps are similar to those for the general process from block 200-208. Here, the hooked functions are memory copy functions, such as memcpy.

Moving from block 208 of FIG. 2, the process moves to block 210*c*. At block 210*c*, the hooked memory copy functions are monitored, including the memory copy functions being called.

The process moves to block 212*c*, where the analyzing the arguments associated with each of the hooked functions in the computer program during its execution are analyzed to determine whether each of the arguments is within predetermined limits, such as limits that were predetermined to be areas of memory that are allowed to be copied or overwritten, or, limits that were predetermined not to include function pointers.

This analysis of block 212*c* includes checking one or both of the source memory block and the destination memory block. The source memory block could be checked to determine whether it overlaps with any memory block preconfigured not to be copied. The source memory block could also be checked for the presence of function pointers, as copying of such function pointers could lead to pointer leakage which could allow an attacker to more easily exploit the program. Similarly, the destination memory block could be checked to see whether it overlaps with any memory block pre-configured not to be overwritten. The presence of function pointers in a memory block can be detected, for example, by scanning the memory block looking for addresses that reside in a code segment. The destination memory block could also be checked for the presence of function pointers, as overwriting the function pointers could lead to unexpected program behavior.

The process moves to block 214*c*, where it is determined whether such behavior, e.g., an attempt to copy or overwrite a predetermined not-to-be-copied or non-overwritable block, is detected; or, function pointers were detected in a memory block. If no, at block 214*c*, the process moves to block 216*c*, where the behavior is considered to be normal. However, if such behavior, e.g., an attempt to copy or overwrite a predetermined not-to-be-copied or non-overwritable block, is detected; or, function pointers were detected in a memory block, at block 214*c*, the behavior is deemed to be anomalous, at block 218*c*.

Figure 6:
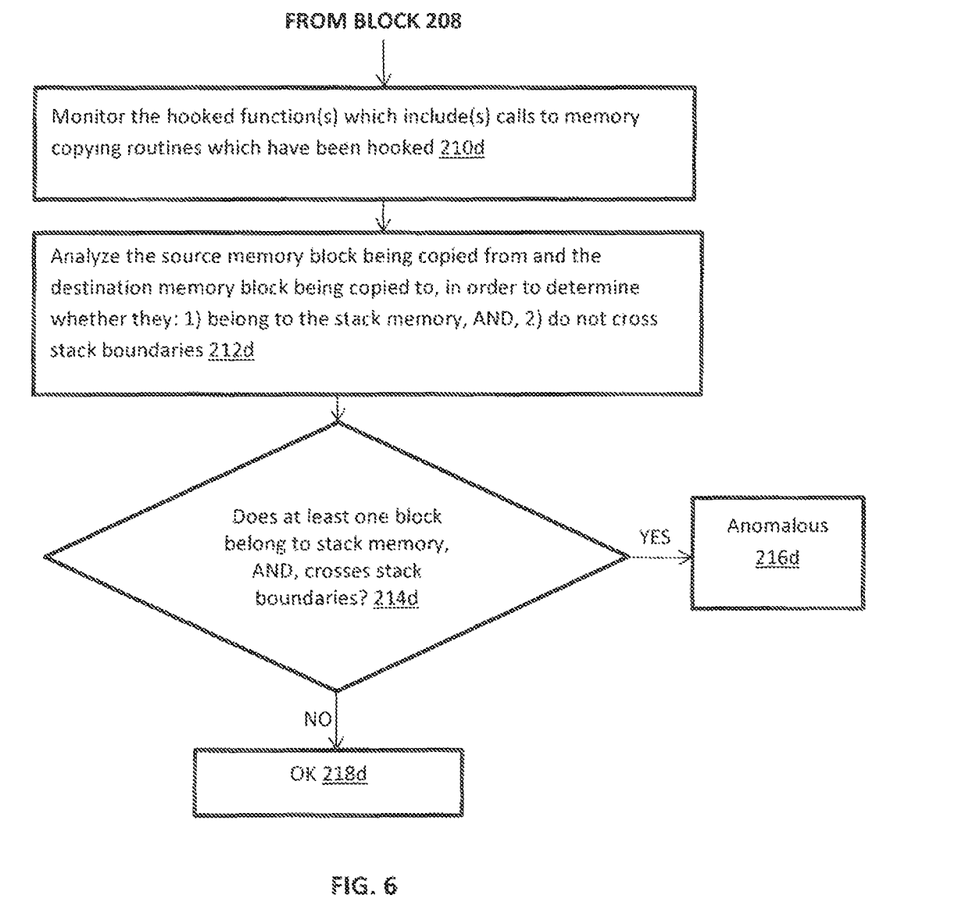

FIG. 6 is a flow diagram of another example process for determining input which triggers (initiates) a software bug. The process steps are similar to those for the general process from blocks 200-208. Here, the hooked functions are memory copying routines, such as memcpy.

Moving from block 208 to block 210*d*, the hooked functions, which include calls made to memory copying routines, are monitored. The monitoring is, for example, for memory copying routines such as memcpy. The process moves to block 212*d*, where the memory copying routines (e.g., of the respective hooked functions) are called, and that the source memory block being copied from, and the destination memory block being copied to, are each analyzed to determine whether they: 1) belong to stack memory, and, 2) that the source and/or destination memory blocks do not cross stack boundaries. The stack boundaries are, for example, defined by stack memory used by each function in a nested set of function calls.

The process moves to block 214*d*, where it is determined whether at least one of the memory blocks belong to the stack memory, and does at least one of the memory blocks cross any stack boundaries. If no, at block 214*d*, the behavior is normal, at block 216*d*, and action is typically not taken. However, at block 214*d*, should stack boundaries be crossed, the behavior is deemed to be anomalous, at block 218*d*.

As described above, at blocks 218, 218*a*, 218*b*, 218*c*, 218*d*, where anomalous (program) behavior is detected, the input associated with the hooked function is considered as likely to have been triggered by a software bug. Additionally, the type of behavior along with the input provided to the program can, for example, be recorded Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for identifying inputs which trigger bugs in a computer program comprising:
    obtaining a snapshot of the state of an executing computer program;

creating an executable package associated with the computer program including a fuzzing manager and a fuzzing driver;
activating the executable package, to 1) run the fuzzing manager and the fuzzing driver, to instrument the computer program with at least one predetermined function to be hooked, and 2) execute the instrumented computer program;
analyzing at least one argument associated with each of the hooked functions in the computer program during its execution, to determine whether each of the at least one arguments is within predetermined limits; or matches a predetermined pattern; and,
should the at least one argument associated with each of the hooked functions in the computer program, be outside of the predetermined limits, or does not match a predetermined pattern, determine the input of the computer program to be the trigger of a bug in the computer program; and,
extracting metadata from the snapshot, the metadata including one or more of: 1) mapping between function names and their addresses; 2) basic block information of code of the computer program associated with a hook for hooking a function in the computer program; and, 3) information on memory being used such as identifying stack boundaries, VFTs (Virtual Function Tables), and segments of the code of the computer program, to be used in detecting anomalous behavior of the computer program.

2. The method of claim 1, wherein the instrumented computer program executes from the point that the snapshot was obtained.

3. The method of claim 1, wherein the creating the executable package additionally includes one or more of: fuzzing input seeds, the metadata, the computer program or portions thereof, the snapshot, and a list of the functions to be hooked.

4. The method of claim 1, wherein the activating the executable package additionally comprises: running the fuzzing manager and the fuzzing driver to load the instrumented computer program, and provide input to the instrumented computer program.

5. The method of claim 1, wherein the at least one argument includes the length of data being sent or received by each of the hooked functions.

6. The method of claim 1, wherein the analyzing the at least one argument associated with each of the hooked functions in the computer program during its execution, to determine whether each of the at least one arguments is within the predetermined limits includes:
recording boundaries of at least one memory block when a hooked function is called to allocate or initialize said at least one memory block; and,
checking the at least one argument against the recorded boundaries for a memory block that crosses at least one of said recorded boundaries, when performing a memory copy operation.

7. The method of claim 6, wherein the predetermined limits include the memory copy operation crossing the recorded boundary.

8. The method of claim 6, wherein the predetermined limits include:
at least one of the memory blocks belonging to stack memory; or,
at least one memory block crossing the stack boundaries.

9. The method of claim 1, wherein the analyzing the at least one argument associated with each of the hooked functions in the computer program during its execution, to determine whether each of the at least one of arguments is within the predetermined limits or matches a predetermined pattern includes determining:
1) whether one or both of: a) a source memory block, and/or, b) a destination memory block overlaps with any memory block predetermined not to be copied or overwritten, or
2) whether a function pointer is present in: a) a source memory block and/or, b) a destination memory block.

10. The method of claim 9, wherein the predetermined limits include: 1) limits that were predetermined to be areas of memory that are allowed to be copied or overwritten; or, 2) limits that were predetermined not to include function pointers.

11. The method of claim 1, wherein the analyzing the at least one argument associated with each of the hooked functions in the computer program during its execution, to determine whether each of the at least one argument is within the predetermined limits or matches a predetermined pattern includes:
when the hooked functions include memory copying routines, that the source memory block is being copied from, and the destination memory block being copied to, the source memory block and the destination memory block are each analyzed to determine whether they: 1) belong to stack memory, and, 2) that the source and/or destination memory blocks do not cross any stack boundaries.

* * * * *